UNITED STATES PATENT OFFICE.

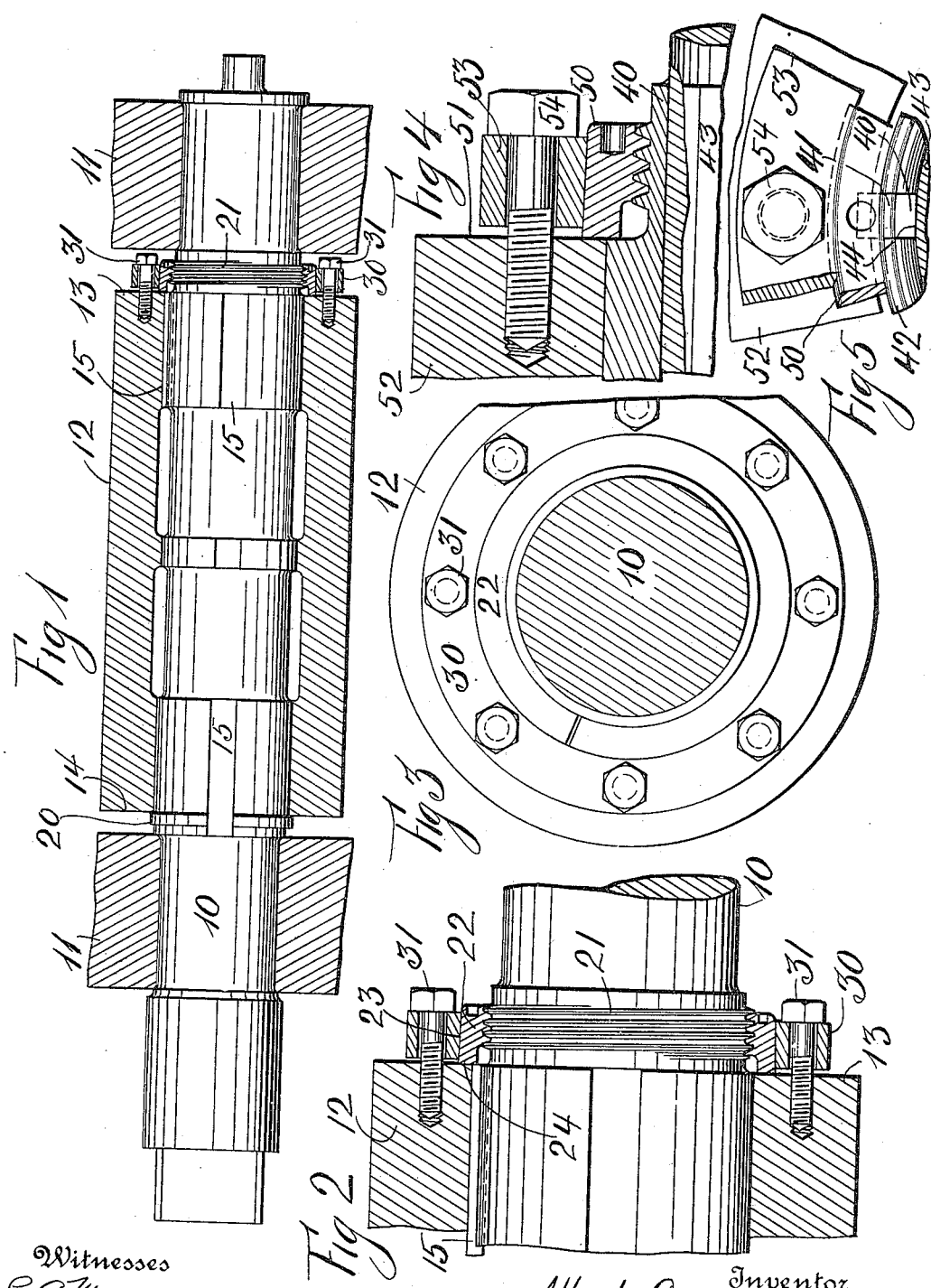

ALBERT GROSSMANN, OF BROOKLYN, NEW YORK.

LOCK-RING FOR ROLLS.

994,152.

Specification of Letters Patent.  Patented June 6, 1911.

Application filed December 14, 1907. Serial No. 406,435.

*To all whom it may concern:*

Be it known that I, ALBERT GROSSMANN, a citizen of the United States, and a resident of the borough of Brooklyn, in the county of Kings and State of New York, have invented certain new and useful Improvements in Lock-Rings for Rolls, of which the following is a specification.

This invention relates to lock-rings for rolls. Its object is the production of a lock ring, with which a roll can be easily and securely fastened to a shaft or axle which supports the same.

The invention is specially applicable to lock rings for cane mill rolls.

In the accompanying drawings Figure 1 shows an axial section of a cane mill roll with an exemplification of the invention, Fig. 2 represents an enlarged portion of Fig. 1, Fig. 3 is a right hand end view of Fig. 2, Fig. 4 shows a partial axial section of a modification of the invention, Fig. 5 represents an end view of Fig. 4.

A shaft 10 is supported in journal bearings 11, and carries a roll 12 with end faces 13 and 14. The roll is fastened to the said shaft by means of keys 15, which principally prevent the rotation of the roll on the shaft. To prevent the lateral movement of the roll 12 on the said shaft 10, a collar 20 may be formed on one end of the shaft, and the other end thereof has formed thereon a thread 21, on which latter is carried a lock ring, consisting of the split nut 22 with an outer conical or tapering surface 23. The end bearing surface 24 of said nut can bear against the end face 13 of the roll 12. On the outer surface of the nut 22 is carried the clamping ring 30 with an inner conical or tapered bearing surface that engages with the outer surface of the nut 22. Bolts 31 pass through openings in the ring 30 and are screwed into threaded openings in the face 13 of the roll 12.

To use the invention the roll 12 is located on the shaft 10 with the keys 15, the face 14 bearing against the collar 20. The nut 22 is then screwed on the thread 21 and its face 24 made to bear against the face 13 of the roll, after which the clamping ring 30 is brought home on the nut by screwing up the bolts 31, by means of which the nut will be tightly clamped on threads 21. It will be noted that when the nut 22 is brought up hard against the end face 13 of the roll 12, that it will creep up on the thread 21, and that finally the clamping ring 30 will force it down in place on said threads.

The invention is shown with the clamping ring only connected with one end of the roll 12, and it is evident that it may be applied to both ends thereof.

In Fig. 4 the invention is modified by prolonging its keys 40 and forming on the same the threaded portion 41, which will gage with threads 42 of the shaft 43, which latter has a seat 44 for said threaded portion, but is otherwise similar to the shaft 10. A split lock ring 50 similar to 22 engages the threaded portion 41 and threads 42, and its end face bears against the end face 51 of the roll 52. A clamping ring 53 similar to 30 bears on the lock ring 50 and it is brought home by means of the bolts 54. With the modified form of the invention the keys 40 are prevented from moving out of place after being properly located, by virtue of the threaded portions 41 of the keys engaging with the threaded portions of the lock rings. It will be noted that in place of a collar like 20 being formed with the shaft, that a lock ring can be used for each end face of the roll.

Having described my invention, I claim:

1. The combination of a shaft, a roll on the shaft, means to prevent the rotation of the roll relative to the shaft, means on the shaft for one end face of the roll to bear against, an adjustable split lock ring on the shaft bearing against the other end face of the roll, an adjustable clamping ring on the lock ring, and connections between the latter and the roll to tighten the split lock ring in place.

2. The combination of a shaft, a roll on the shaft, means on the shaft for one end face of the roll to bear against, means to prevent the rotation of the roll relative to the shaft, a thread on the shaft, a split nut on the thread bearing against the other end face of the roll, and means to hold the nut in place.

3. The combination of a shaft, a collar extending from the shaft, a roll on the shaft with one of its end faces bearing against said collar, a key connecting the shaft and the roll, a thread formed at one end of the shaft, a split nut on the thread with its end face bearing against the accompanying end face of the roll, a clamping ring on the nut, and means to tighten the clamping ring on the said nut.

4. The combination of a shaft, a roll on the shaft, means to prevent the rotation of the roll relative to the shaft, means on the shaft for one end face of the roll to bear against, a thread formed at one end of the shaft, a split nut on the thread having a conical outer surface, a clamping ring with an inner conical surface engaging the outer surface of the split nut, and bolts connecting the clamping ring and the roll.

Signed at New York, in the county of New York and State of New York this 13th day of December A. D. 1907.

ALBERT GROSSMANN.

Witnesses:
ARTHUR MARION,
MARTIN ZIMANSKY.

Copies of this patent may be obtained for five cents each, by addressing the "Commissioner of Patents, Washington, D. C."